US012712421B2

(12) United States Patent
Hiemstra et al.

(10) Patent No.: US 12,712,421 B2
(45) Date of Patent: Aug. 18, 2026

(54) ELECTROMAGNETIC ACTUATOR

(71) Applicant: Apple Inc., Cupertino, CA (US)

(72) Inventors: David Hiemstra, Santa Clara, CA (US); Nils E. Larson, San Jose, CA (US); Robert R. Ingersoll, San Francisco, CA (US); Eddy Sugyarto, San Jose, CA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 18/221,773

(22) Filed: Jul. 13, 2023

(65) Prior Publication Data

US 2024/0079940 A1 Mar. 7, 2024

Related U.S. Application Data

(60) Provisional application No. 63/404,069, filed on Sep. 6, 2022.

(51) Int. Cl.
*H02K 33/02* (2006.01)
*G06F 3/01* (2006.01)

(52) U.S. Cl.
CPC ............. *H02K 33/02* (2013.01); *G06F 3/016* (2013.01)

(58) Field of Classification Search
CPC ..... H01H 85/25; H01H 85/0241; H01H 85/32
See application file for complete search history.

(56) References Cited

U.S. PATENT DOCUMENTS 5,892,629 A 4/1999 Nishihara et al.
6,243,078 B1 6/2001 Rosenberg
6,610,942 B1 8/2003 Anderson et al.
8,283,839 B2 10/2012 Heim
8,411,427 B2 4/2013 Jeong et al.
9,607,491 B1 3/2017 Mortiner et al.
9,821,672 B2 11/2017 Chae et al.
10,146,309 B2 12/2018 Tissot et al.
10,160,010 B2 * 12/2018 Chun .................... H02K 33/16
10,381,908 B2 * 8/2019 Akanuma ............. H02K 33/16
10,726,258 B2 7/2020 Park et al.
10,952,427 B2 3/2021 Kwon et al.
11,002,589 B1 5/2021 Zhang et al.
11,177,680 B2 11/2021 Lee et al.
11,246,229 B2 2/2022 Lee et al.
12,176,782 B2 * 12/2024 Shi ......................... H02K 33/00
2011/0316361 A1 * 12/2011 Park ....................... H02K 33/16
310/25

(Continued)

FOREIGN PATENT DOCUMENTS

JP 2008141857 6/2008

*Primary Examiner* — Bernard Rojas

(74) *Attorney, Agent, or Firm* — Brownstein Hyatt Farber Schreck, LLP

(57) ABSTRACT

A haptic actuator includes a housing having a ferromagnetic wall. The ferromagnetic wall has a set of one or more half shear ferromagnetic features protruding from the ferromagnetic wall into the housing. A movable magnet is positioned within the housing. A pair of springs, respectively attached to opposite sides of the housing and opposite ends of the movable magnet, bias the movable magnet toward a position of rest between the pair of springs. An electric coil is attached to the set of one or more half shear ferromagnetic features and positioned between the movable magnet and the set of one or more half shear ferromagnetic features.

12 Claims, 10 Drawing Sheets

(56) References Cited

U.S. PATENT DOCUMENTS

2012/0187780 A1 7/2012 Bang et al.
2014/0035397 A1 2/2014 Endo et al.
2017/0070131 A1* 3/2017 Degner .................. H02K 33/00
2017/0127166 A1 5/2017 Noma
2017/0214306 A1* 7/2017 Katada ................... H02K 33/16
2020/0227993 A1* 7/2020 Zang ...................... H02K 33/02
2020/0289001 A1 9/2020 Mantrawadi et al.
2020/0393397 A1 12/2020 Vulto et al.
2021/0075306 A1 3/2021 Little
2022/0101992 A1 3/2022 Porter et al.
2023/0168740 A1 6/2023 Larson et al.
2023/0275498 A1* 8/2023 Ikezoe ...................... B06B 1/04
310/15
2024/0079941 A1 3/2024 Hiemstra et al.
2025/0111974 A1 4/2025 Amin-Shahidi et al.

* cited by examiner 112
104
122
102
106-2
118
118
118
118

ELECTROMAGNETIC ACTUATOR

CROSS-REFERENCE TO RELATED APPLICATION

This application is a nonprovisional and claims the benefit under 35 U.S.C. § 119(e) of U.S. Provisional Patent Application No. 63/404,069, filed Sep. 6, 2022, the contents of which are incorporated herein by reference as if fully disclosed herein.

FIELD

The described embodiments generally relate to electromagnetic actuators, such as electromagnetic actuators that function as haptic actuators.

BACKGROUND

Many electronic devices include a haptic actuator. For example, haptic actuators may be included in smartphones, computers (e.g., tablet computers or laptop computers), wearable electronic devices (e.g., electronic watches or health monitors), and game controllers. A haptic actuator can give a user of an electronic device a tactile notification of an event (e.g., an alarm or an alert). In some cases, a haptic actuator may be driven using different electrical waveforms, which different electrical waveforms produce different types of tactile notifications associated with different types of events.

One type of haptic actuator is an electromagnetic actuator, in which a movable component is electromagnetically moved with respect to a stationary component to provide a haptic output (e.g., a vibration or a tap).

SUMMARY

Embodiments of the systems, devices, methods, and apparatus described in the present disclosure are directed to electromagnetic actuators, such as electromagnetic actuators that function as haptic actuators. More particularly, the present disclosure describes ways to reduce the part count of an electromagnetic actuator, ways to reduce the number of process steps that are needed to build an electromagnetic actuator, ways to improve the magnetic symmetry of an electromagnetic actuator, ways to improve the appearance of an electromagnetic actuator, and/or ways to provide other advantages relevant to electromagnetic actuators.

In a first aspect, the present disclosure describes a haptic actuator. The haptic actuator may include a housing having a ferromagnetic wall. The ferromagnetic wall may have a set of one or more half shear ferromagnetic features protruding from the ferromagnetic wall into the housing. A movable magnet may be positioned within the housing. A pair of springs, respectively attached to opposite sides of the housing and opposite ends of the movable magnet, may bias the movable magnet toward a position of rest between the pair of springs. An electric coil may be attached to the set of one or more half shear ferromagnetic features and positioned between the movable magnet and the set of one or more half shear ferromagnetic features.

In another aspect, the present disclosure describes an electromagnetic actuator. The electromagnetic actuator may include a housing having a ferromagnetic wall. The ferromagnetic wall may have a set of one or more half shear ferromagnetic features protruding from the ferromagnetic wall into the housing. An electromagnetic assembly may be housed within the housing and include a stationary component and a movable component.

In another aspect, the present disclosure describes an electromagnetic actuator. The electromagnetic actuator may include a housing having an exterior surface. The exterior surface may have a set of recesses extending from the exterior surface toward an interior of the actuator. An adhesive on the exterior surface may at least partially surround the set of recesses as a whole. Recesses of the set of recesses, and portions of the exterior surface disposed between adjacent recesses of the set of recesses, may be adhesive-free. A flexible cover may be attached to the adhesive and extend over the set of recesses.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figures 1A, 1B:
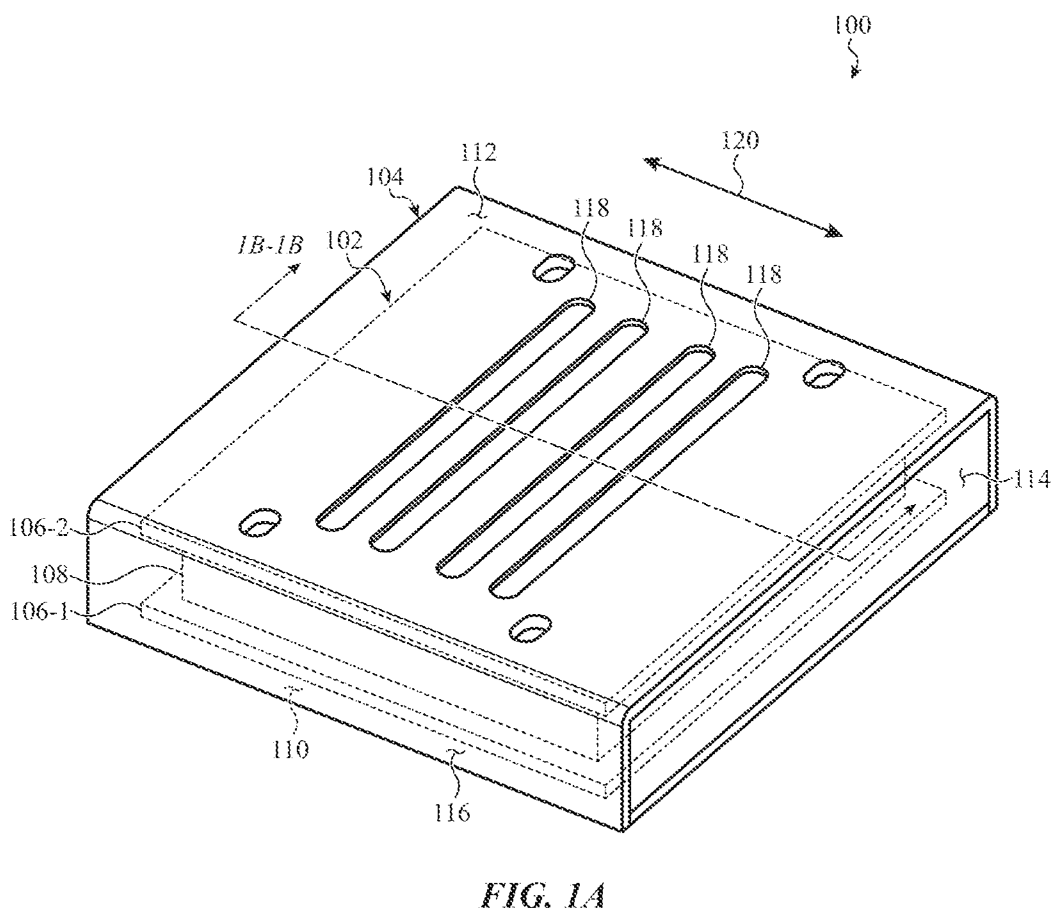
FIG. 1A shows a first example electromagnetic actuator.
FIG. 1B shows a cross-section of part of the upper wall and part of the stationary component described with reference to FIG. 1A.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

An electromagnetic or haptic actuator may include a movable magnet suspended by a pair of springs. In some cases, additional masses may be attached to the magnet. The movable magnet may be moved by applying an electric current (e.g., an alternating current) to one or more electric coils positioned adjacent the movable magnet. The movable magnet and electric coil(s) may be housed in a ferromagnetic housing.

To improve the performance of an electromagnetic or haptic actuator, the electric coil(s) may be separated from the walls of the ferromagnetic housing by raised ferromagnetic features that focus magnetic flux between the moving magnet and a magnetic flux return path through the ferromagnetic housing. Focusing the magnetic flux can provide a greater output force and magnetic spring stiffness at a desired resonance. The raised ferromagnetic features also create a standoff between the electric coil(s) and the ferromagnetic housing, which standoff can be used to route a flexible printed circuit (FPC) and/or lead wires for supplying electric current to the electric coil(s).

The ferromagnetic features to which an electric coil is attached are traditionally formed by welding ferromagnetic plates to the inside of a ferromagnetic housing. This method increases the actuator part count, requires welding equipment and fixtures, and results in an inline welding cosmetic yield loss during mass production. Despite additional process steps to mechanically flatten the welds via "re-striking," and increasing weld inspection frequency, some actuators can still include defects (e.g., defects resulting from weld spatter shorting to the electric coils). An additional drawback of welding ferromagnetic plates to the inside of a ferromagnetic housing is that the size and shape of the ferromagnetic plates must be compatible with pick and place automation equipment, which can restrict the number and shapes of the ferromagnetic plates and lead to greater magnetic asymmetry. The use of ferromagnetic plates can also restrict the available options for routing electric coil lead wires or a FPC.

Described herein are systems, devices, methods, and apparatus that include or form half shear electromagnetic features. The half shear electromagnetic features may be formed using a stamping (or partial punch) process. The stamping process is performed on the ferromagnetic housing to displace one or more portions of a wall of the housing, thereby creating half shear electromagnetic features that protrude into the housing. No extra process steps are needed to de-burr, flatten, weld, or otherwise process the half shear electromagnetic features, saving both time and cost. Half shear stamping can also provide a designer greater flexibility in selecting electromagnetic feature shapes, sizes, and so on, depending on flux force and field density requirements. As an example, magnetic field concentration can be increased near the center of an actuator to maximize force. As another example, force may be reduced at the end of a stroke of a movable magnet, to increase the restoring force that pulls the movable magnet back toward the center of the actuator when the magnet nears the ends of its stroke (which can improve actuator efficiency and reduce stress on other components).

One potential drawback to forming half shear electromagnetic features is that the process leaves recesses on the exterior surface of the ferromagnetic housing (i.e., the "negative" of the ferromagnetic features). If an adhesive is applied over the recesses, a flexible cover attached to the adhesive can be pulled into the recesses. Useful techniques for applying an adhesive and attaching a flexible cover are therefore described herein.

Described herein with reference to FIGS. 1A-10 are systems, devices, methods, and apparatus that, in some cases, improve the operation of an electromagnetic or haptic actuator, reduce its part count and the number of process steps needed to manufacture the actuator, and/or provide various other advantages.

Directional terminology, such as "top", "bottom", "upper", "lower", "front", "back", "over", "under", "above", "below", "left", or "right" is used with reference to the orientation of some of the components in some of the figures described below. Because components in various embodiments can be positioned in a number of different orientations, directional terminology is used for purposes of illustration only and is usually not limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

FIG. 1A shows a first example electromagnetic actuator 100. In some embodiments, the actuator 100 may be a haptic actuator, such as a haptic actuator usable in an electronic device (e.g., a mobile phone, a wearable device, a tablet computer, or a game controller).

The actuator 100 includes an electromagnetic assembly 102 housed within a housing 104. The electromagnetic assembly 102 may include a stationary component 106 and a movable component 108. In some embodiments, the stationary component 106 may include one or more electric coils, and the movable component 108 may include one or more magnets (e.g., one or more permanent magnets). In other embodiments, the stationary component 106 may include one or more magnets, and the movable component 108 may include one or more electric coils. In some embodiments, the stationary component 106 may be bifurcated into two components 106-1, 106-2 (e.g., first and second electric coils) disposed on opposite sides of the movable component 108. This can improve magnetic symmetry, operating performance, and reliability of the actuator 100. Each of the stationary and movable components 106, 108 may also include other elements.

The housing 104 may include one or more components. In some embodiments, the housing 104 may include a lower wall 110 and an upper wall 112. The lower wall 110 and the upper wall 112 may be joined by one or more sidewalls 114, 116, such as a band that forms a set of sidewalls 114, 116 (two of which are visible in FIG. 1, and two of which are not visible); or the lower and upper walls 110, 112 may have integral portions that form one or more of the sidewalls 114, 116; or surfaces of a pair of springs that provide a restorative force to the movable component 108 may form part or all of a pair of sidewalls (e.g., opposing sidewalls including sidewall 114), as described with reference to FIG. 2A; or plates attached to the pair of springs may form part or all of a pair of sidewalls (e.g., opposing sidewalls including sidewall 114).

The housing 104 may have various walls, some or all of which may be metallic, and some of which may include metal and/or plastic and may be optionally formed by surfaces of the pair of springs (or by plates attached to the pair of springs). At least one of the walls (e.g., the upper wall 112) may be ferromagnetic. In some embodiments a wall opposite the upper wall 112 (i.e., the lower wall 110) may also be ferromagnetic. In some embodiments, a pair of opposing sidewalls that connect the lower wall 110 and the upper wall 112 (e.g., sidewalls including sidewall 116) may be ferromagnetic. In some embodiments, all of the walls, including sidewalls 114 and 116 and their opposing sidewalls (not shown), may be ferromagnetic walls.

The upper wall 112 may have a set of one or more half shear features (e.g., one or more half shear ferromagnetic features 118) protruding from the wall 112 into the housing 104. By way of example, the upper wall 112 is shown to have four half shear ferromagnetic features 118, in the form of parallel rectangular ribs. In some embodiments, the ribs may be oriented perpendicular to an axis of travel 120 of the movable component 108. In other embodiments, the ribs may be oriented or laid out in other ways, or the upper wall 112 may include other shapes and/or orientations of half shear ferromagnetic features. Formation of the one or more half shear ferromagnetic features 118 may leave one or more corresponding recesses in an exterior surface of the wall 112. In some embodiments, the recesses may be covered by a rigid or flexible cover attached to the exterior surface of the wall 112, as described with reference to FIGS. 8 and 9.

A pair of springs may be respectively attached to opposite sides of the housing 104 and opposite ends of the movable component 108 (e.g., opposite ends of a magnet). The pair of springs may bias the movable component 108 toward a rest position between the pair of springs. In some embodiments, one or both of the springs in the pair of springs may include a flexure spring (e.g., a spring formed from a single piece of material having different sections that are biased apart from one another, or a spring including multiple segments that are joined at some points and biased apart from one another at other points).

FIG. 1B shows a cross-section of part of the upper wall 112 and part of the stationary component 106-2 described with reference to FIG. 1A (taken along cut line 1B-1B). As shown, the four half shear ferromagnetic features 118 protrude from the wall 112 into an interior of the housing 104. In some embodiments of the actuator 100, at least part of the stationary component 106 (e.g., portion 106-2, such as an electric coil) may be attached to (i.e., mechanically mounted on) the half shear ferromagnetic features 118. In some embodiments, portion 106-2 of the stationary component 106 may be adhesively bonded (glued) to the half shear ferromagnetic features 118.

The half shear ferromagnetic features 118 may provide various advantages. For example, the half shear ferromagnetic features 118 may provide a standoff between the stationary component 106 and the wall 112. The standoff may improve the flux return path for a magnetic circuit formed by and within the housing 104. The dimensions (heights, widths, lengths), shapes, number, and layout of the half shear ferromagnetic features 118 may be selected to provide a particular flux return path, tune the magnetic symmetry of the actuator 100, tune the magnetic stiffness or torsional stiffness of the actuator 100 (e.g., to reduce or eliminate rotation of the movable component 108), or adjust the magnetic roll-off at the end of a stroke of the movable component 108.

In some embodiments, various components may be positioned or routed between adjacent half shear ferromagnetic features 118. For example, a FPC 122 or electric coil lead wire may be routed between adjacent ones of the half shear ferromagnetic features 118 (e.g., between adjacent ribs).

The half shear ferromagnetic features 118 may be formed by a stamping process. An advantage to stamping the half shear ferromagnetic features 118 in the wall 112 is that it eliminates the burrs and sharp edges associated with a feature that is first cut out of a sheet stock and then welded in place. Another advantage of stamping the half shear ferromagnetic features 118 is that each feature can be formed with a single stamping operation (versus having to cut, place, weld, and then de-burr a feature). In some embodiments, all of the features can be formed in parallel, with a single stamping operation, thereby eliminating alignment issues created by having to place and attach separate features. In the past, alignment issues have been mitigated, in some cases, by attaching ferromagnetic features to each other using material bridges that join the ferromagnetic features (even though the ferromagnetic features are intended to be separate). However, these material bridges can interfere with the magnetic performance of an actuator 100, are often undesirable, and can be eliminated by forming ferromagnetic features as half shear ferromagnetic features.

Figure 2A:
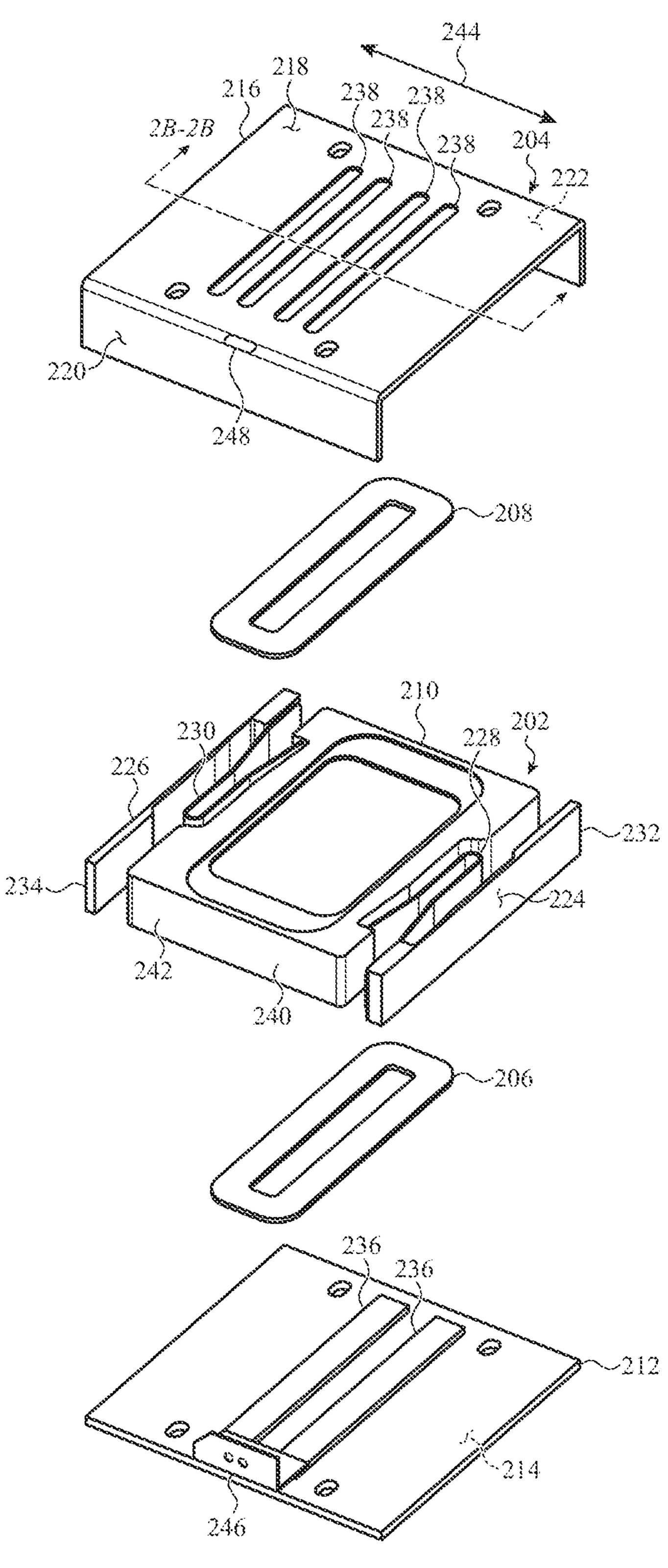
FIG. 2A shows an exploded view of a second example electromagnetic actuator.

FIG. 2A shows an exploded view of a second example electromagnetic actuator 200. In some embodiments, the actuator 200 may be a haptic actuator, such as a haptic actuator usable in an electronic device (e.g., a mobile phone, a wearable device, a tablet computer, or a game controller).

The actuator 200 includes an electromagnetic assembly 202 positioned within a housing 204. The electromagnetic assembly 202 may include a pair of electric coils 206, 208 and a movable magnet 210 (e.g., one or more permanent magnets). By way of example, each electric coil 206, 208 may be formed as a substantially planar racetrack having a dimension perpendicular to an axis of travel 244 of the movable magnet 210 that is greater than a dimension parallel to the axis of travel 244. In other embodiments, the electric coils 206, 208 may have other shapes or dimensions. In some embodiments, the actuator 200 may only include one of the electric coils 206 or 208. In some embodiments, movement of the movable magnet 210 may be optionally guided by a spindle or rails that extend along the axis of travel 244.

The housing 204 may include one or more components that form one or more walls, with the wall being positioned around the electromagnetic assembly 202. In some embodiments, the housing 204 may include a base plate 212 defining a lower wall 214, and a cap 216 defining an upper wall 218 (with the upper wall 218 opposite the lower wall 214). Each of the base plate 212 and the cap 216 may be ferromagnetic. The cap 216 may also define a first pair of opposite sidewalls 220, 222. A second pair of opposite sidewalls 224, 226 may be defined by surfaces of a pair of springs 228, 230 and/or by sidewall plates 232, 234 attached to the pair of springs 228, 230. Alternatively, the second pair of opposite sidewalls 224, 226 could also be defined by the cap 216, or by the base plate 212, or by a band that defines all of the sidewalls 220, 222, 224, 226. The various components of the housing 204 may include tabs, pins, or clips that help position them with respect to each other or keep them engaged with each other. Additionally or alternatively, the components of the housing 204 may be attached by welds, fasteners, adhesives, or other attachment means.

Each of the lower wall 214 and the upper wall 218 may have a respective set of one or more half shear ferromagnetic features 236 or 238 that protrude from the lower or upper wall 214, 218 into the housing 204. A first electric coil 206 may be attached to (i.e., mechanically mounted on) the set of one or more features 236 that protrude from the lower wall 214, and a second electric coil 208 may be attached to the set of one or more features 238 that protrude from the upper wall 218. The movable magnet 210 may be disposed between the first and second electric coils 206, 208. Likewise, the first electric coil 206 may be positioned between the movable magnet 210 and the set of one or more features 236, and the second electric coil 208 may be positioned between the movable magnet 210 and the set of one or more features 238.

In some embodiments, various components may be positioned or routed between adjacent half shear ferromagnetic features 236 or 238. For example, a FPC or electric coil lead wires 246 may extend between adjacent ones of the half shear ferromagnetic features 236 or 238 (e.g., between adjacent ribs) and be routed out of the housing 204 via a hole 248 in the housing 204.

The pair of springs 228, 230 may be respectively attached to opposite sides of the housing 204 (e.g., to opposite sides of the base plate 212 and cap 216) and to opposite ends of the movable magnet 210. Optionally, one or more masses 240, 242 may be positioned between the movable magnet 210 and each spring 228, 230, to increase the magnitude of the haptic force that the actuator 100 can produce. In some embodiments, the masses 240, 242 may be formed by a single distributed mass. In some embodiments, one or both of the springs 228, 230 may be a flexure spring (e.g., a spring formed from a single piece of material having different sections that are biased apart from one another, or a spring including multiple segments that are joined at some points and biased apart from one another at other points).

In operation, an electric current (e.g., an alternating current) may be applied to the electric coils 206, 208 to cause the movable magnet 210 to translate back and forth along the axis of travel 244. The pair of springs 228, 230 may bias the movable magnet 210 toward a position of rest between the pair of springs 228, 230, and may alternately store and release mechanical energy to assist the electric coils 206, 208 in moving the movable magnet 210.

Figure 2B:
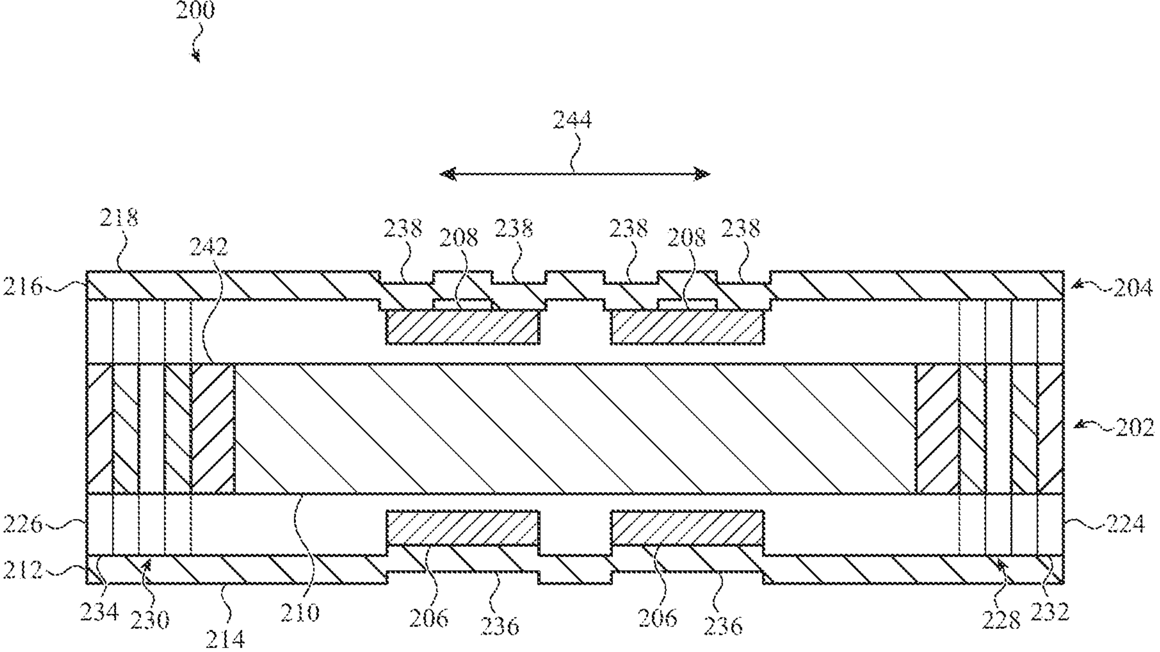
FIG. 2B shows an assembled cross-section of the electromagnetic actuator described with reference to FIG. 2A.

FIG. 2B shows an assembled cross-section of the electromagnetic actuator 200 described with reference to FIG. 2A (taken along cut line 2B-2B). As shown, the movable magnet 210 may be disposed between the first electric coil 206 and the second electric coil 208. The first electric coil 206 may be attached to the set of one or more features 236 that protrude from the lower wall 214, and the second electric coil 208 may be attached to the set of one or more features 238 that protrude from the upper wall 218.

By way of example, the set of one or more features 236 is shown to include two features 236. More specifically, the set of one or more features 236 includes two ribs. Also by way of example, the set of one or more features 238 is shown to include four features 238 and, more specifically, four ribs. The two ribs are shown to be wider than the four ribs. In some embodiments, all of the ribs may have the same length and depth. However, in other embodiments, different ribs may have different widths, lengths, or depths. In other embodiments, each set of one or more features 236, 238 may include more or fewer ribs, or features having other shapes or layouts. The sets of one or more features 236, 238 may have respective different numbers of features, as shown, or may alternatively have respective equal numbers of features. The features 236, 238 may be otherwise varied as described with reference to FIG. 1B.

FIGS. 3-7 show various example sets of half shear features in a wall of a housing. In some embodiments, the wall may be a wall of one of the housings described with reference to FIGS. 1A-1B or 2A-2B. In some embodiments, the walls and half shear features may be ferromagnetic.

Figure 3:
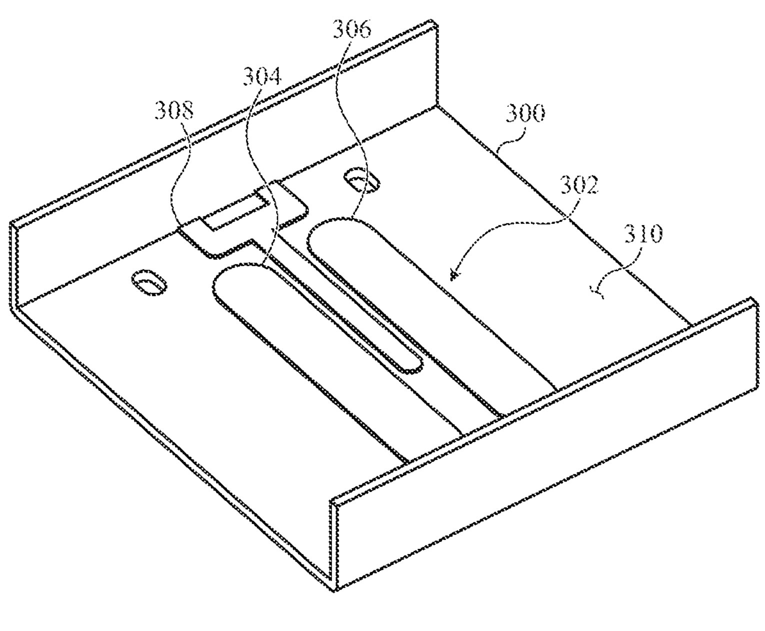
FIG. 3 shows a first example set of half shear features protruding from a wall of a housing.

FIG. 3 shows a first example set of half shear features 302 protruding from a wall 300 of a housing. By way of example, the wall 300 may be the lower wall of the housing described with reference to FIGS. 2A-2B. The set of half shear features 302 includes two ribs 304, 306. The ribs 304, 306 may be parallel rectangular ribs, with each rib 304, 306 having the same height, width, and length. Alternatively, the ribs 304, 306 may have different characteristics.

Optionally, a FPC 308 or electric coil lead wire may extend between the ribs 304, 306. In some embodiments, the FPC 308 or electric coil lead wire(s) may be adhesively bonded to an interior surface 310 of the wall 300. An electrical coil, such as the lower electric coil described with reference to FIGS. 2A-2B, may be electrically coupled to the FPC 308. Other electronic components may also be electrically coupled to the FPC 308.

Figure 4:
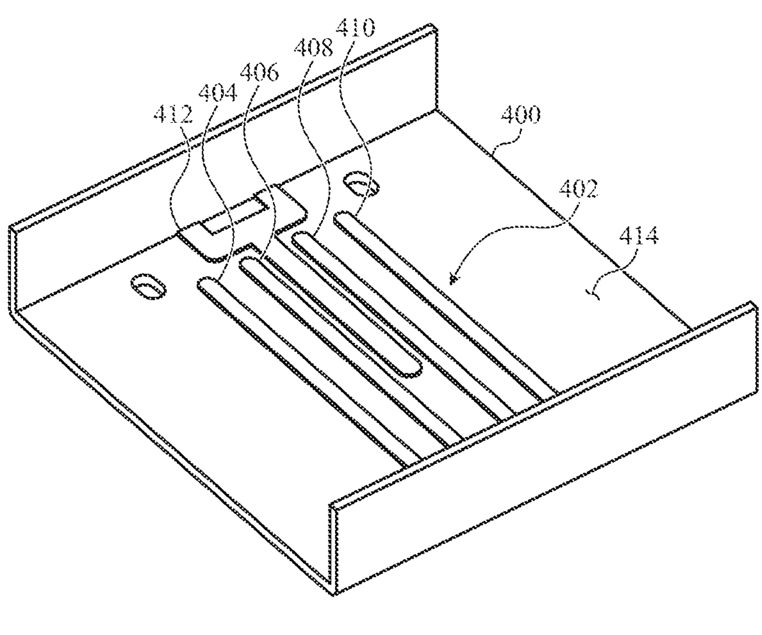
FIG. 4 shows a second example set of half shear features protruding from a wall of a housing.

FIG. 4 shows a second example set of half shear features 402 protruding from a wall 400 of a housing. By way of example, the wall 400 may be the upper wall of the housing described with reference to FIGS. 2A-2B. The set of half shear features 402 includes four ribs 404, 406, 408, 410. The ribs 404, 406, 408, 410 may be parallel rectangular ribs, with each rib 404, 406, 408, 410 having the same height, width, and length. Alternatively, the ribs 404, 406, 408, 410 may have different characteristics. More ribs (e.g., as shown in FIG. 4 versus FIG. 3) may in some cases improve the mechanical stiffness of a wall in which the ribs are formed.

Optionally, a FPC 412 or electric coil lead wire may extend between adjacent ones of the ribs 404, 406, 408, 410. In some embodiments, the FPC 412 or electric coil lead wire(s) may be adhesively bonded to an interior surface 414 of the wall 400. An electrical coil, such as the upper electric coil described with reference to FIGS. 2A-2B, may be electrically coupled to the FPC 412. Other electronic components may also be electrically coupled to the FPC 412.

Figure 5:
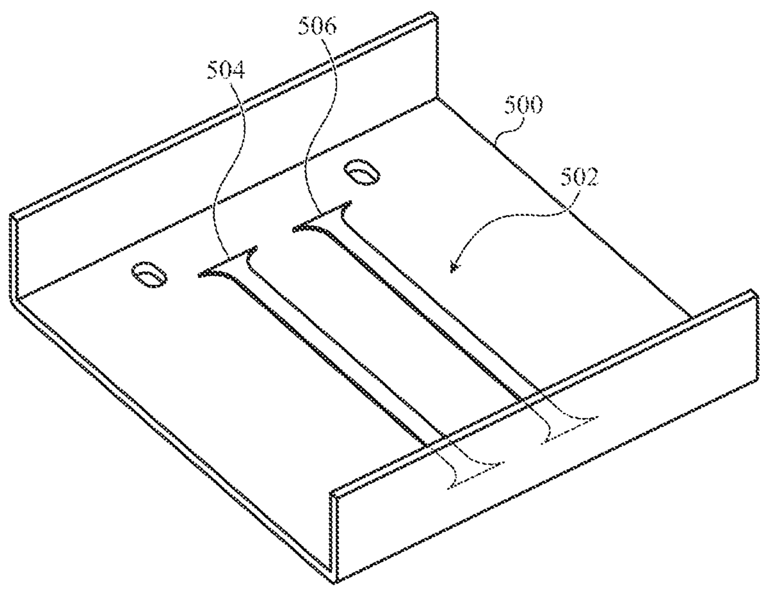
FIG. 5 shows a third example set of half shear features protruding from a wall of a housing.

FIG. 5 shows a third example set of half shear features 502 protruding from a wall 500 of a housing. By way of example, the set of half shear features 502 includes a pair of elongate ribs 504, 506 having flared ends (i.e., the sides of each rib may extend in parallel for a portion of the length of each rib, but may diverge from each other toward each end of each rib). The flared ends may help to focus magnetic flux in some embodiments. The ribs 504, 506 could alternatively or additionally have flared mid-sections (e.g., diamond-shaped mid-sections).

Figure 6:
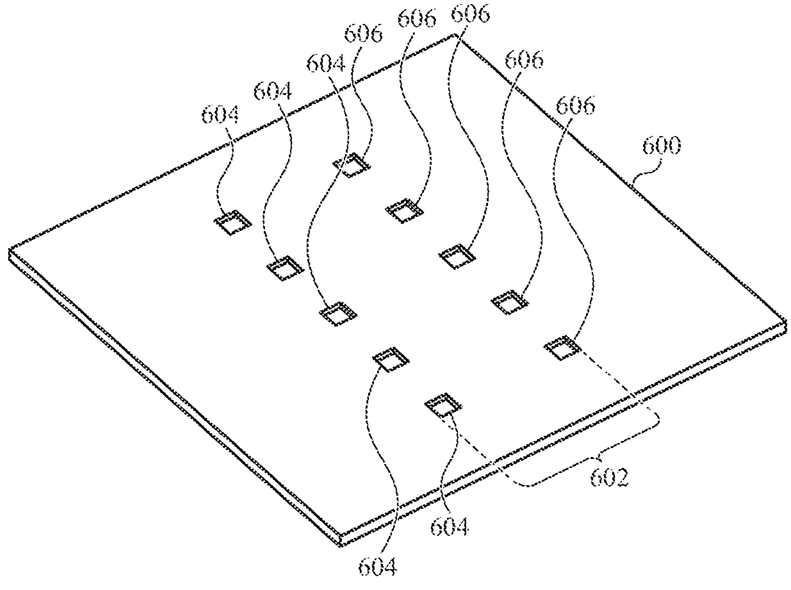
FIG. 6 shows a fourth example set of half shear features protruding from a wall of a housing.

FIG. 6 shows a fourth example set of half shear features 602 protruding into an upper surface of a wall 600 of a housing (and similarly, out of a lower surface of the wall 600). By way of example, the set of half shear features 602 includes at least one array of same size features (e.g., a first line (or one-dimensional array) of same size features 604, and a second line (or one-dimensional array) of same size features 606). In some embodiments, all of the features 604, 606 may be the same. In some embodiments, each feature 604, 606 may have a square perimeter. In alternative embodiments, each feature 604, 606 may have a rectangular, circular, oval, or other shape perimeter.

Figure 7:
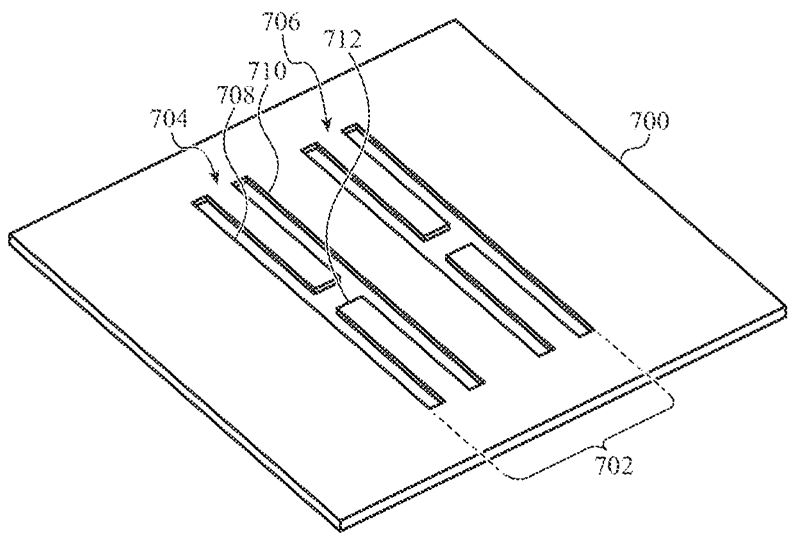
FIG. 7 shows a fifth example set of half shear features protruding from a wall of a housing.

FIG. 7 shows a fifth example set of half shear features 702 protruding into an upper surface of a wall 700 of a housing (and similarly, out of a lower surface of the wall 700). By way of example, the set of half shear features 702 includes adjacent H-shaped features 704, 706 (i.e., parallel ribs 708, 710 joined by a perpendicular connector 712). In alternative embodiments, the set of half shear features 702 may only include a single H-shaped feature, or one or more half shear features 702 may be ladder-shaped (i.e., a half shear feature may have more than one perpendicular connector 712 connecting its parallel ribs 708, 710) or have overlapping H-shapes (i.e., an additional rib parallel to the ribs 708 and 710, and connected to one of the ribs 708, 710 by an additional perpendicular connector).

Although FIGS. 1A-7 show sets of half shear ferromagnetic features having the same height, the half shear ferromagnetic features may alternatively have different heights.

Figure 9:
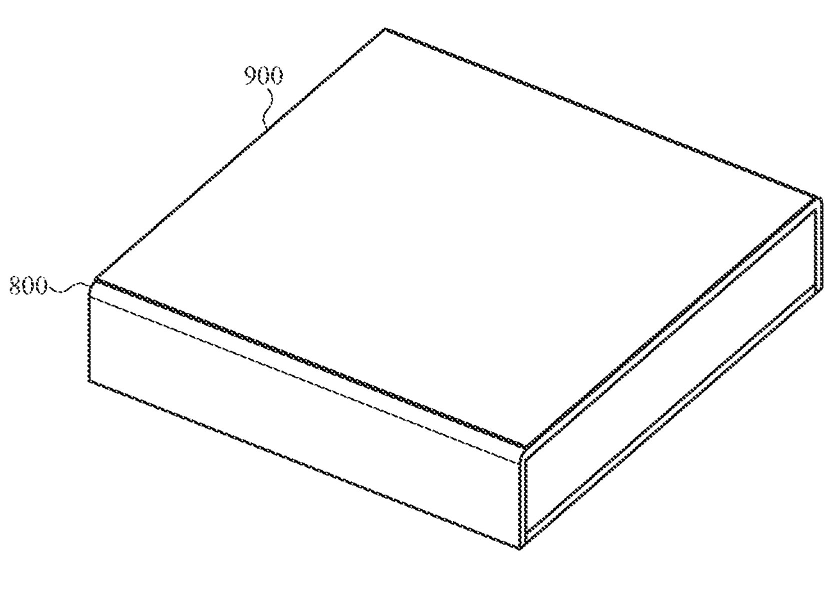
FIG. 9 shows an example attachment of a flexible cover to the adhesive shown in FIG. 8.
Figure 10:
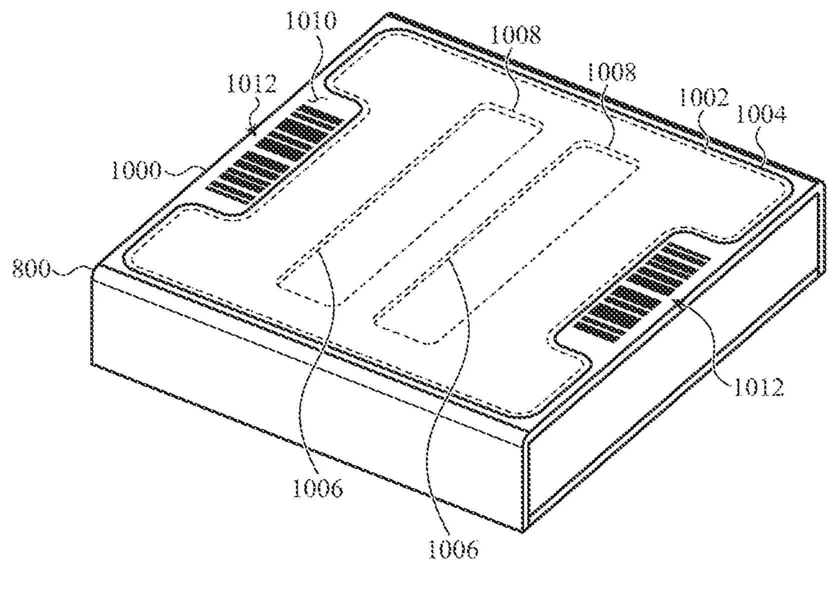
FIG. 10 shows another example attachment of a flexible cover to an adhesive on a wall of a housing.

As shown in FIGS. 1A-1B and 2A-2B, the formation of one or more half shear features in a wall of a housing may leave one or more corresponding recesses in an exterior surface of the housing. If an adhesive is applied to the entirety of the exterior surface, and a flexible cover is placed on the adhesive, the curing of the adhesive may tend to draw the flexible cover into the recesses, which may be unsightly or otherwise undesirable. To address this, FIGS. 8-10 show alternative ways to attach a flexible cover to an exterior surface of a housing.

Figure 8:
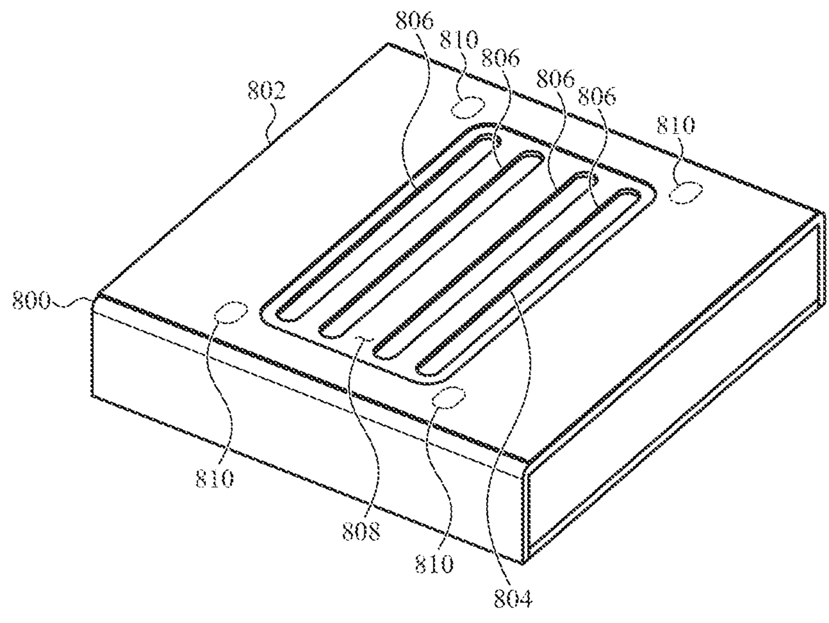
FIG. 8 shows an example application of an adhesive to a wall of a housing.

FIG. 8 shows an example application of an adhesive 802 to a wall 800 of a housing. In some embodiments, the wall 800 may be a wall of one of the housings described with reference to FIGS. 1A-1B or 2A-2B. In some embodiments, the wall 800 may be ferromagnetic.

A set of one or more half shear features 804 may protrude from the wall 800 into the housing. By way of example, the features 804 are shown to include four parallel ribs, similar to the features described with reference to FIG. 4. The type(s) and layout of features may alternatively take other forms.

The process of forming the features 804 (e.g., stamping) may leave corresponding recesses 806 in an exterior surface 808 of the wall 800. In some embodiments, it may be desirable or necessary to cover the recesses 806 with a rigid or flexible cover. To avoid having portions of a flexible cover pulled into the recesses 806, an adhesive 802 (e.g., a pressure sensitive adhesive (PSA)) may be applied to the exterior surface 808 such that it surrounds the set of recesses 806 as a whole. The recesses 806, and portions of the exterior surface 808 disposed between adjacent recesses, may be left adhesive-free.

As shown, the adhesive 802 may be spaced apart from the set of recesses 806 by an offset. Alternatively, the adhesive 802 may be applied up to the boundaries of the set of recesses 806. As another alternative, the adhesive 802 may be applied between the recesses if the recesses are sufficiently spaced apart to allow application of the adhesive 802 between the recesses without extending into the recesses. In some embodiments, the adhesive 802 may extend only partially around the set of recesses 806 instead of extending fully around the set of recesses 806 (e.g., the adhesive 802 may define one or more gaps about the perimeter of the set of recesses 806.

FIG. 9 shows an example attachment of a flexible cover 900 to the adhesive 802 shown in FIG. 8. In some embodiments, the flexible cover 900 may include a layer of polyethylene terephthalate (PET). The flexible cover 900 may extend over the set of recesses 806, but is not attached to any adhesive 802 in or over the set of recesses 806. As a result, the flexible cover 900 does not pull into the set of recesses 806, regardless of whether the adhesive is pressed.

In some embodiments, the wall 800 may define a set of one or more holes 810, such as one or more inspection holes that may be used for viewing or contacting components within a housing during device test. If the holes 810 are sufficiently small, the adhesive 802 may extend over the holes 810. However, if the holes 810 are larger (and even when the holes 810 are small), the adhesive 802 may be applied to the exterior surface 808 around but not over the holes 810, thereby preventing the flexible cover 900 from pulling into the holes 810. In some embodiments, the adhesive 802 may only partially surround each hole 810.

FIG. 10 shows another example attachment of a flexible cover 1004 to an adhesive 1002 on a wall 1000 of a housing. In some embodiments, the wall 1000 may be a wall of one of the housings described with reference to FIGS. 1A-1B or 2A-2B. In some embodiments, the wall 1000 may be ferromagnetic.

A set of half shear features 1006 may protrude from the wall 1000 into the housing. By way of example, the set of features 1006 is shown to include two parallel ribs, similar to the features described with reference to FIG. 3. The type(s) and layout of features may alternatively take other forms.

An adhesive 1002 may be applied around but not over a set of recesses 1008 in an exterior surface 1010 of the wall 1000, where the set of recesses 1008 corresponds to the set of features 1006. In some embodiments, the adhesive 1002 may also be applied around (not over) other features 1012 on, or in, the exterior surface 1010 of the wall 1000. In some embodiments, the features 1012 may include one or more bar codes, engravings, or other part number or type identifications.

A flexible cover 1004, such as a layer of PET, may be attached to the adhesive 1002 and extend over the set of recesses 1008 but not over the features 1012.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A haptic actuator, comprising:

a housing having a ferromagnetic wall, the ferromagnetic wall having a set of one or more half shear ferromagnetic features comprising two or more ribs and protruding from the ferromagnetic wall into the housing;

a movable magnet positioned within the housing;

a flexible printed circuit extending between adjacent ribs of the two or more ribs;

a pair of springs, respectively attached to opposite sides of the housing and opposite ends of the movable magnet and biasing the movable magnet toward a position of rest between the pair of springs; and an electric coil electrically coupled to the flexible printed circuit and attached to the set of one or more half shear ferromagnetic features and positioned between the movable magnet and the set of one or more half shear ferromagnetic features.

2. The haptic actuator of claim 1, wherein the pair of springs comprises a pair of flexure springs.

3. The haptic actuator of claim 1, wherein the set of one or more half shear ferromagnetic features comprises at least four ribs.

4. The haptic actuator of claim 1, wherein the set of one or more half shear ferromagnetic features comprises an array of same size features including the two or more ribs.

5. The haptic actuator of claim 1, wherein:

the ferromagnetic wall is a first ferromagnetic wall, the set of one or more half shear ferromagnetic features is a first set of one or more half shear ferromagnetic features, and the electric coil is a first electric coil;

the housing has a second ferromagnetic wall opposite the first ferromagnetic wall;

the second ferromagnetic wall has a second set of one or more half shear ferromagnetic features; and the haptic actuator comprises a second electric coil attached to the second set of one or more half shear ferromagnetic features and positioned between the movable magnet and the second set of one or more half shear ferromagnetic features.

6. The haptic actuator of claim 5, wherein the first set of one or more half shear ferromagnetic features and the second set of one or more half shear ferromagnetic features include respective equal numbers of half shear ferromagnetic features.

7. The haptic actuator of claim 5, wherein the first set of one or more half shear ferromagnetic features and the second set of one or more half shear ferromagnetic features include respective different numbers of half shear ferromagnetic features.

8. An electromagnetic actuator, comprising:

a housing having a ferromagnetic wall comprising:

a set of one or more half shear ferromagnetic features protruding from the ferromagnetic wall into the housing; and an exterior surface including a set of one or more recesses corresponding to the set of one or more half shear ferromagnetic features;

an adhesive on the exterior surface, wherein:

the adhesive at least partially surrounding the set of one or more recesses as a whole; and recesses of the set of one or more recesses and portions of the exterior surface disposed between adjacent recesses of the set of one or more recesses being adhesive-free;

a flexible cover attached to the adhesive and extending over the set of one or more recesses; and an electromagnetic assembly housed within the housing and including, a stationary component; and a movable component.

9. The electromagnetic actuator of claim 8, wherein the adhesive comprises a pressure sensitive adhesive (PSA).

10. The electromagnetic actuator of claim 9, wherein the flexible cover comprises a layer of polyethylene terephthalate (PET).

11. The electromagnetic actuator of claim 8, wherein the adhesive is spaced apart from the set of one or more recesses by an offset.

12. The electromagnetic actuator of claim 8, wherein:

the ferromagnetic wall defines a set of one or more holes; and the adhesive at least partially surrounds each hole of the set of one or more holes and the set of one or more holes is adhesive-free.

* * * * *